United States Patent
Uto et al.

(10) Patent No.: US 11,721,859 B2
(45) Date of Patent: Aug. 8, 2023

(54) VEHICLE BATTERY COOLING DEVICE

(71) Applicant: Honda Motor Co., Ltd., Tokyo (JP)

(72) Inventors: Hajime Uto, Saitama (JP); Masanobu Takazawa, Saitama (JP); Masaki Nagakura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 108 days.

(21) Appl. No.: 17/142,247

(22) Filed: Jan. 6, 2021

(65) Prior Publication Data
US 2021/0210811 A1    Jul. 8, 2021

(30) Foreign Application Priority Data

Jan. 7, 2020    (JP) .................. 2020-000746

(51) Int. Cl.
*H01M 10/663* (2014.01)
*H01M 10/613* (2014.01)
(Continued)

(52) U.S. Cl.
CPC ...... *H01M 10/663* (2015.04); *B60H 1/00278* (2013.01); *B60K 11/06* (2013.01);
(Continued)

(58) Field of Classification Search
CPC ............ H01M 10/663; H01M 10/613; H01M 10/625; H01M 10/6556; H01M 10/486;
(Continued)

(56) References Cited

U.S. PATENT DOCUMENTS

| 5,490,572 A * | 2/1996 | Tajiri | ............... B60L 1/02 180/68.5 |
| 7,997,966 B2 | 8/2011 | Yoda | |

(Continued)

FOREIGN PATENT DOCUMENTS

| JP | H05262144 | 10/1993 |
| JP | H0840088 | 2/1996 |

(Continued)

OTHER PUBLICATIONS

Office Action of Japan Counterpart Application, with English translation thereof, dated May 16, 2023, pp. 1-6.

*Primary Examiner* — Muhammad S Siddiquee
(74) *Attorney, Agent, or Firm* — JCIPRNET (57) ABSTRACT

The disclosure provides a vehicle battery cooling device including, in a vehicle equipped with a battery for driving, a battery accommodation part, an outside air introduction passage introducing air outside the vehicle, a heat exchanger cooling air introduced into the outside air introduction passage, a first air conditioning passage, a second air conditioning passage, a first discharge passage, and a second discharge passage. The first air conditioning passage is communicated to the heat exchanger and the vehicle room to supply air cooled by the heat exchanger to the vehicle room. The second air conditioning passage is communicated to the heat exchanger and the battery accommodation part to supply air cooled by the heat exchanger to the battery accommodation part. The first discharge passage discharges air in the vehicle room to outside the vehicle. The second discharge passage discharges air in the battery accommodation part to outside the vehicle.

6 Claims, 7 Drawing Sheets

(51) Int. Cl.
  *H01M 10/625* (2014.01)
  *H01M 10/6556* (2014.01)
  *B60H 1/00* (2006.01)
  *B60K 11/06* (2006.01)
(52) U.S. Cl.
  CPC ....... *H01M 10/613* (2015.04); *H01M 10/625* (2015.04); *H01M 10/6556* (2015.04)
(58) Field of Classification Search
  CPC .......... H01M 10/6561; B60H 1/00278; B60H 2001/003; B60H 1/143; B60H 1/32; B60K 11/06; B60K 2001/005; Y02E 60/10; Y02T 10/70; B60L 58/26
  See application file for complete search history.

(56) References Cited

U.S. PATENT DOCUMENTS

| | | | | |
|---|---|---|---|---|
| 2008/0236181 | A1* | 10/2008 | Zhu | H01M 10/663 |
| | | | | 62/239 |
| 2009/0257190 | A1* | 10/2009 | Yoda | H01M 10/667 |
| | | | | 361/690 |
| 2016/0031288 | A1* | 2/2016 | Nishikawa | B60H 1/00899 |
| | | | | 165/43 |
| 2020/0313256 | A1* | 10/2020 | Kuronuma | H01M 10/625 |

FOREIGN PATENT DOCUMENTS

| | | |
|---|---|---|
| JP | 2007106316 | 4/2007 |
| JP | 2008260405 | 10/2008 |
| JP | 2019108019 | 7/2019 |

* cited by examiner

VEHICLE BATTERY COOLING DEVICE

CROSS-REFERENCE TO RELATED APPLICATION

This application claims the priority benefit of Japan application serial no. 2020-000746, filed on Jan. 7, 2020. The entirety of the above-mentioned patent application is hereby incorporated by reference herein and made a part of this specification.

BACKGROUND

Technical Field

The disclosure relates to a vehicle battery cooling device, and more particularly, to an air cooling device for a vehicle driving battery.

Description of Related Art

In hybrid vehicles and electric vehicles which use a motor as part or all of the driving source, the motor is driven by the power supplied by the battery to drive the vehicle. Since the battery generates heat depending on the driving conditions and environmental conditions of the vehicle, a device for cooling the battery is required in order to prevent performance reduction and degradation progress due to the temperature rise of the battery.

There are two types of battery cooling methods, i.e., the air cooling type and the water cooling type. Between them, a conventional air-cooling-type battery cooling device is known to have a configuration in which the battery is cooled by using the air in the vehicle room, and the exhaust air after cooling is circulated to the vehicle room again.

For example, Patent Document 1 (Japanese Laid-Open No. 2019-108019) discloses that a cooling system which is equipped in a hybrid vehicle and cools a battery pack accommodating batteries includes: a temperature sensor which detects a cooling water temperature of an engine; a duct which is communicated to a vehicle room and a power storage device; a blower which is provided at the duct and sends the air in the vehicle room to the power storage device; a communication port which is provided near a rear glass to return the air after cooling the power storage device into the vehicle room; and a control device. In this configuration, the air in the vehicle room is sent to the battery pack via an intake duct, and heat exchange with the battery is performed to cool the battery. Then, the air after the heat exchange is discharged to a luggage room at the rear side of the battery pack, and is returned from the luggage room to the vehicle room again through the communication port provided at a package tray.

In the configuration in which the air after cooling the battery is returned to the vehicle room as in the cooling system described in Patent Document 1, the heat generated by the battery is transferred into the vehicle room. As a result, since the temperature in the vehicle room rises locally, in addition to reducing the cooling efficiency in the vehicle room, for example, there is an issue that the merchantability of the air conditioning performance is lowered, e.g., causing discomfort due to warm air to an occupant sitting in the rear seat.

SUMMARY

An exemplary embodiment of the disclosure, a vehicle battery cooling device includes, in a vehicle equipped with a battery 2 for driving, a battery accommodation part (battery capsule 3 in the embodiments (the same applies hereinafter in this paragraph)), an outside air introduction passage 4, a heat exchanger 5, a first air conditioning passage 6, a second air conditioning passage 7, a first discharge passage 8, and a second discharge passage 9. The battery accommodation part accommodates the battery 2. The outside air introduction passage 4 introduces air outside the vehicle as outside air. The heat exchanger 5 cools air introduced into the outside air introduction passage 4. The first air conditioning passage 6 is communicated to the heat exchanger 5 and a vehicle room 10 to supply air cooled by the heat exchanger 5 to the vehicle room 10. The second air conditioning passage 7 is communicated to the heat exchanger 5 and the battery accommodation part to supply air cooled by the heat exchanger 5 to the battery accommodation part. The first discharge passage 8 discharges air in the vehicle room 10 to outside the vehicle. The second discharge passage 9 discharges air in the battery accommodation part to outside the vehicle.

DESCRIPTION OF THE EMBODIMENTS

The disclosure provides a battery cooling device capable of efficiently cooling a battery without deteriorating the air conditioning performance in a vehicle room in an air-cooling-type battery cooling device.

An exemplary embodiment of the disclosure, a vehicle battery cooling device includes, in a vehicle equipped with a battery 2 for driving, a battery accommodation part (battery capsule 3 in the embodiments (the same applies hereinafter in this paragraph)), an outside air introduction passage 4, a heat exchanger 5, a first air conditioning passage 6, a second air conditioning passage 7, a first discharge passage 8, and a second discharge passage 9. The battery accommodation part accommodates the battery 2. The outside air introduction passage 4 introduces air outside the vehicle as outside air. The heat exchanger 5 cools air introduced into the outside air introduction passage 4. The first air conditioning passage 6 is communicated to the heat exchanger 5 and a vehicle room 10 to supply air cooled by the heat exchanger 5 to the vehicle room 10. The second air conditioning passage 7 is communicated to the heat exchanger 5 and the battery accommodation part to supply air cooled by the heat exchanger 5 to the battery accommodation part. The first discharge passage 8 discharges air in the vehicle room 10 to outside the vehicle. The second discharge passage 9 discharges air in the battery accommodation part to outside the vehicle.

According to this vehicle battery cooling device, after the air outside the vehicle is introduced into the outside air introduction passage and cooled by the heat exchanger, it is supplied to the vehicle room and the battery accommodation part independently of each other via the first air conditioning passage and the second air conditioning passage, respectively. As a result, the cooling in the vehicle room and the cooling of the battery can be efficiently performed independently.

Also, since the battery is accommodated in the battery accommodation part, and the passage for discharging the air in the vehicle room and the passage for discharging the air in the battery accommodation part are separately provided, it is possible to prevent the exhaust air after heat exchange with the battery from directly flowing into the vehicle room, and it is possible to prevent the air conditioning performance in the vehicle room from deteriorating.

According to an exemplary embodiment of the disclosure, in the vehicle battery cooling device, further includes a first circulation passage 11 and a second circulation passage 12. The first circulation passage 11 is communicated to the vehicle room 10 and the outside air introduction passage 4 to circulate air in the vehicle room 10 as inside air to the outside air introduction passage 4. The second circulation passage 12 is communicated to the battery accommodation part and the outside air introduction passage 4 to circulate air in the battery accommodation part as inside air to the outside air introduction passage 4.

According to this configuration, the air in the vehicle room and in the battery accommodation part is returned to the outside air introduction passage and circulated through the first circulation passage and the second circulation passage, respectively, i.e., inside air circulation can be performed, and the cooling in the vehicle room and the cooling of the battery can be performed efficiently.

In addition, since the first circulation passage which circulates the air in the vehicle room and the second circulation passage which circulates the air in the battery accommodation part are separately provided, the exhaust air after passing through the battery accommodation part can be returned to the outside air introduction passage and circulated without passing through inside of the vehicle room. Therefore, it is possible to prevent the air conditioning performance in the vehicle room from deteriorating due to the exhaust air after heat exchange with the battery.

According to an exemplary embodiment of the disclosure, in the vehicle battery cooling device, further includes a mode switching valve (switching valve 13) and a flow rate adjusting means (flow rate adjusting valve 14, ECU 17). The mode switching valve is provided at a connection part of the outside air introduction passage 4 connected with the first circulation passage 11 and the second circulation passage 12, and switches between an outside air introduction mode which introduces outside air into the heat exchanger 5 and an inside air circulation mode which circulates inside air to the heat exchanger by opening and closing the outside air introduction passage 4. The flow rate adjusting means is provided on a downstream side of the heat exchanger 5 and adjusts amounts of air flowing respectively to the first air conditioning passage 6 and the second air conditioning passage 7.

According to this configuration, by switching between the outside air introduction mode and the inside air circulation mode by the mode switching valve, it is possible to efficiently cool the inside of the vehicle room and cool the battery. In addition, since the amounts of air flowing to the vehicle room and the battery accommodation part are adjusted by the flow rate adjusting means, it is possible to efficiently adjust the flow rate according to the temperature conditions of the battery and the vehicle room, e.g., increasing the cooling efficiency by increasing the flow rate into the vehicle room when it is not necessary to cool the battery.

Figure 5:
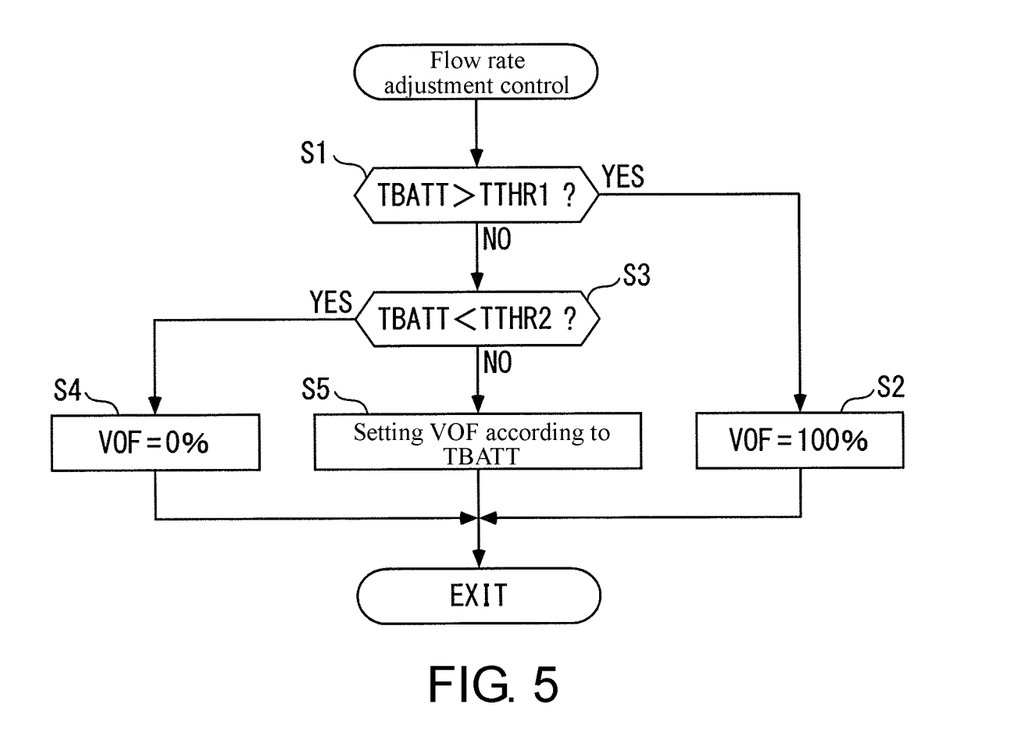
FIG. 5 is a flowchart showing a control process of flow rate adjustment by the flow rate adjusting means.
Figure 6:
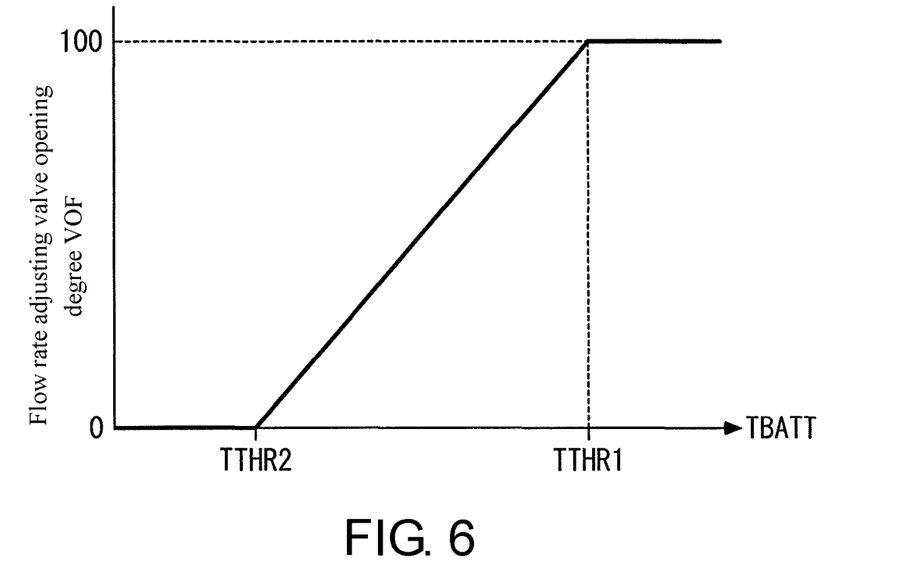
FIG. 6 is a map for setting an opening degree of the flow rate adjusting valve according to a battery temperature.

According to an exemplary embodiment of the disclosure, in the vehicle battery cooling device, further includes a battery temperature sensor 15 detecting a temperature of the battery 2. The flow rate adjusting means variably adjusts the amounts of air flowing respectively to the first air conditioning passage 6 and the second air conditioning passage 7 according to the temperature TBATT of the battery 2 detected by the battery temperature sensor 15 (FIG. 5 and FIG. 6).

According to this configuration, since the flow rate adjusting means variably adjusts the amounts of air flowing to the vehicle room and the battery accommodation part based on the battery temperature, it is possible to adjust the flow rate more efficiently according to the temperature conditions, e.g., giving priority to either the cooling of the battery or the cooling of the vehicle room as needed.

According to an exemplary embodiment of the disclosure, in the vehicle battery cooling device, the battery accommodation part is arranged in the vehicle room 10.

According to this configuration, for example, in cold weather use such as performing heating as air conditioning in the vehicle room, the exhaust heat of the battery 2 may add to the air conditioning performance, which can contribute to the improvement of the heating performance.

Figure 1:
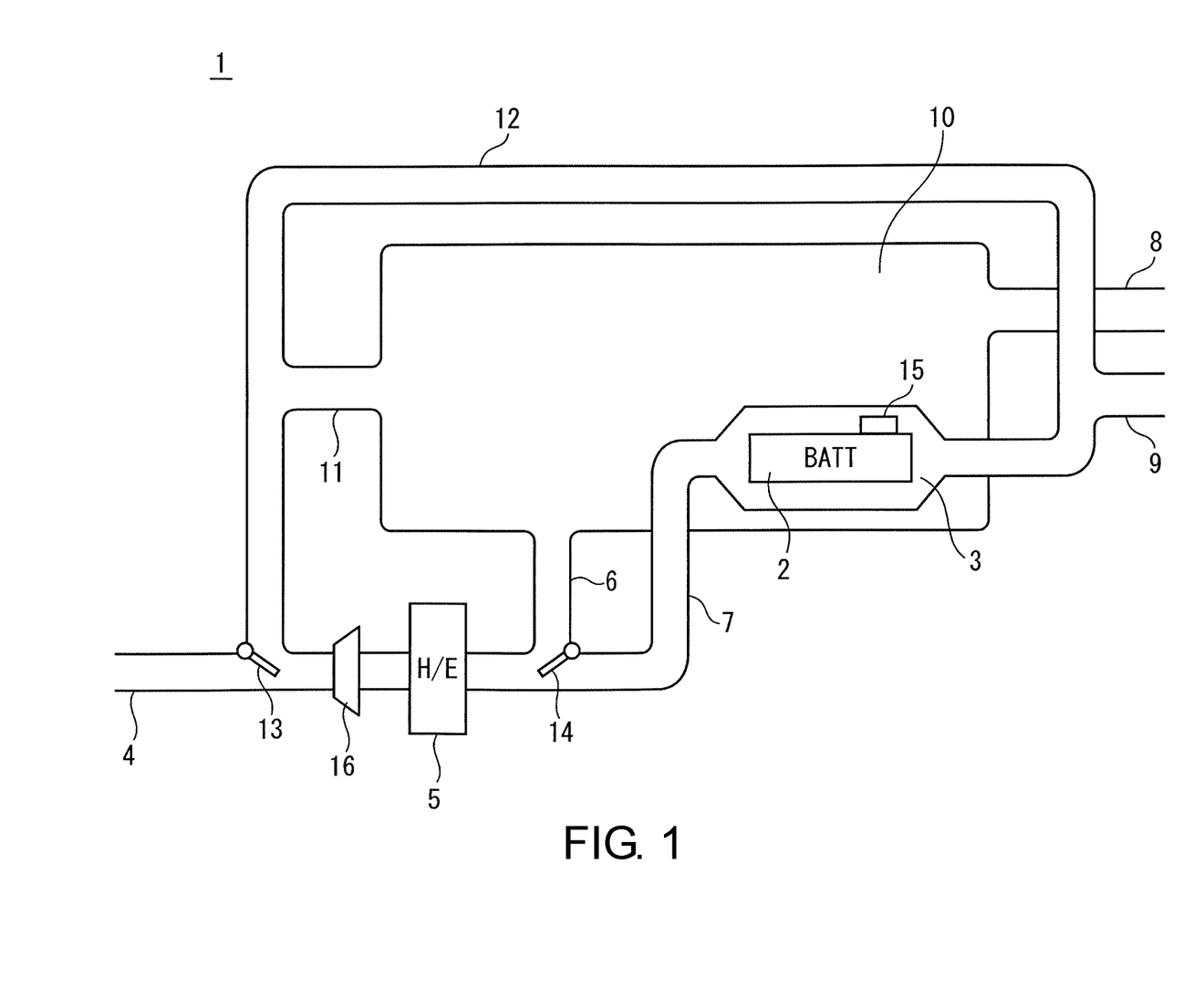
FIG. 1 is a view schematically showing a vehicle battery cooling device according to an embodiment of the disclosure.

Hereinafter, exemplary embodiments of the disclosure will be described in detail with reference to the drawings. FIG. 1 schematically shows a vehicle battery cooling device according to an embodiment of the disclosure. Applicable to a hybrid vehicle which uses a motor and an internal combustion engine (neither shown) as the driving source, the vehicle battery cooling device 1 cools a battery 2 which supplies electric power to the motor and also functions as an air conditioner which cools the inside of the vehicle room.

In the vehicle battery cooling device 1, the battery 2 is accommodated in a battery capsule 3 which surrounds the battery 2, and the battery capsule 3 is arranged in a vehicle room 10. The battery capsule 3 may be configured with heat insulating properties by, for example, being made of a plate-shaped, cloth-shaped, or sheet-shaped heat insulating material, but the battery capsule 3 is not limited thereto.

The vehicle battery cooling device 1 includes an outside air introduction passage 4 which is communicated to the outside of the vehicle to introduce the air outside the vehicle as outside air, and a heat exchanger 5 which cools the air introduced into the outside air introduction passage 4. Further, the outside air introduction passage 4 is provided with a blower 16 for sending air to the vehicle room 10 side.

The heat exchanger 5 is connected to a refrigerant flow path (not shown) and cools the introduced air by evaporating the refrigerant. The heat exchanger 5 is connected with a first air conditioning passage 6 which is communicated to the vehicle room 10 to supply the cooled air to the vehicle room 10, and a second air conditioning passage 7 which is communicated to the battery capsule 3 to supply the cooled air to the battery capsule 3.

The vehicle room 10 is connected with a first discharge passage 8 for discharging the air in the vehicle room 10 to the outside of the vehicle, and a first circulation passage 11 for returning the air in the vehicle room 10 to the outside air introduction passage 4. In addition, the battery capsule 3 is connected with a second discharge passage 9 for discharging the air in the battery capsule 3 to the outside of the vehicle, and a second circulation passage 12 for returning the air in the battery capsule 3 to the outside air introduction passage 4.

The outside air introduction passage 4 is provided with a switching valve 13 which simultaneously switches the opening and closing of the outside air introduction passage 4, the first circulation passage 11, and the second circulation passage 12 at a connection part with the first circulation passage 11 and the second circulation passage 12. When the switching valve 13 is at a position of opening the outside air introduction passage 4 and closing the first circulation passage 11 and the second circulation passage 12, the vehicle battery cooling device 1 operates in an outside air introduction mode in which the outside air is introduced and at the same time the same amount of air is discharged to the outside of the vehicle. Further, when the switching valve 13 is at a position of closing the outside air introduction passage 4 and opening the first circulation passage 11 and the second circulation passage 12, the vehicle battery cooling device 1 operates in an inside air circulation mode in which the introduction of the outside air and the discharge of air to the outside of the vehicle are stopped and the inside air is circulated. The outside air introduction mode and the inside air circulation mode may be arbitrarily switched according to the intention of the occupant, for example, by operating a control panel provided near the driver's seat of the vehicle.

Figure 2:
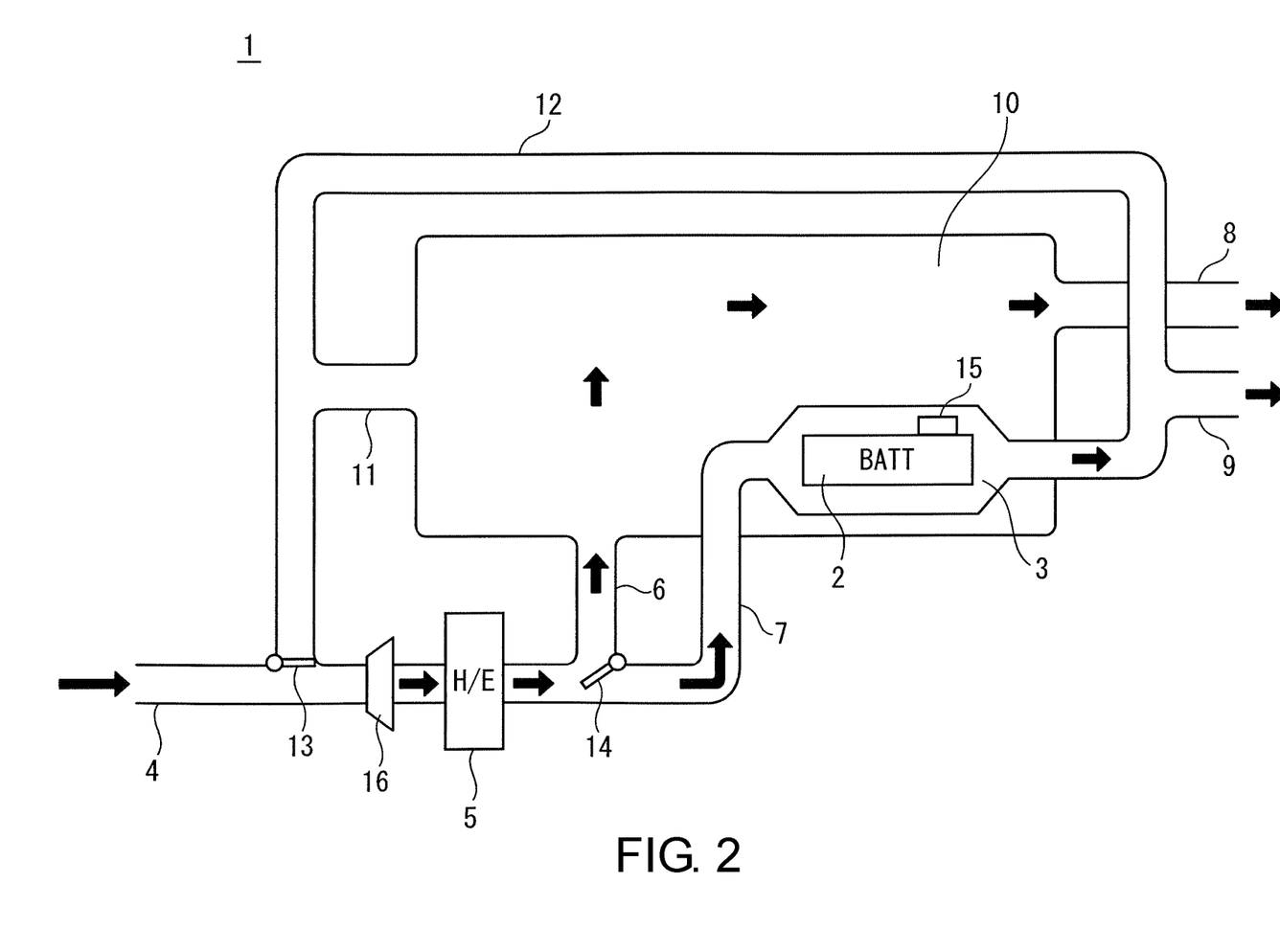
FIG. 2 is a view showing the air flow in an outside air introduction mode.

FIG. 2 is a view showing the air flow in the outside air introduction mode. When the switching valve 13 is at the position of opening the outside air introduction passage 4 and closing the first circulation passage 11 and the second circulation passage 12, the outside air is introduced into the outside air introduction passage 4. The introduced outside air is cooled as it passes through the heat exchanger 5. A portion of the cooled air is supplied to the vehicle room 10 through the first air conditioning passage 6 to perform cooling in the vehicle room 10, and also, the remaining portion is supplied to the battery capsule 3 through the second air conditioning passage 7 as needed to cool the battery 2. Further, the flow rates of the first air conditioning passage 6 and the second air conditioning passage 7 are adjusted by changing the opening degree of a flow rate adjusting valve 14 provided on the downstream side of the heat exchanger 5. The control of this flow rate adjustment will be described later.

The air supplied into the vehicle room 10 is then discharged to the outside of the vehicle via the first discharge passage 8. In addition, the air supplied to the battery capsule 3 is then discharged to the outside of the vehicle via the second discharge passage 9.

Accordingly, in the outside air introduction mode, the air cooled by the heat exchanger 5 is supplied to the vehicle room 10 and the battery capsule 3 independently of each other via the first air conditioning passage 6 and the second air conditioning passage 7, respectively. Therefore, the cooling of the vehicle room 10 and the cooling of the battery 2 can be efficiently performed independently. In addition, since the battery 2 is accommodated in the battery capsule 3, and also the first discharge passage 8 for discharging the air in the vehicle room 10 and the second discharge passage 9 for discharging the air in the battery capsule 3 are separately provided, it is possible to prevent the high-temperature exhaust air after heat exchange with the battery 2 from directly flowing into the vehicle room, it is possible to prevent the air conditioning performance in the vehicle room 10 from deteriorating, and it is also possible to prevent causing discomfort to the occupant due to warm air or the like.

Figure 3:
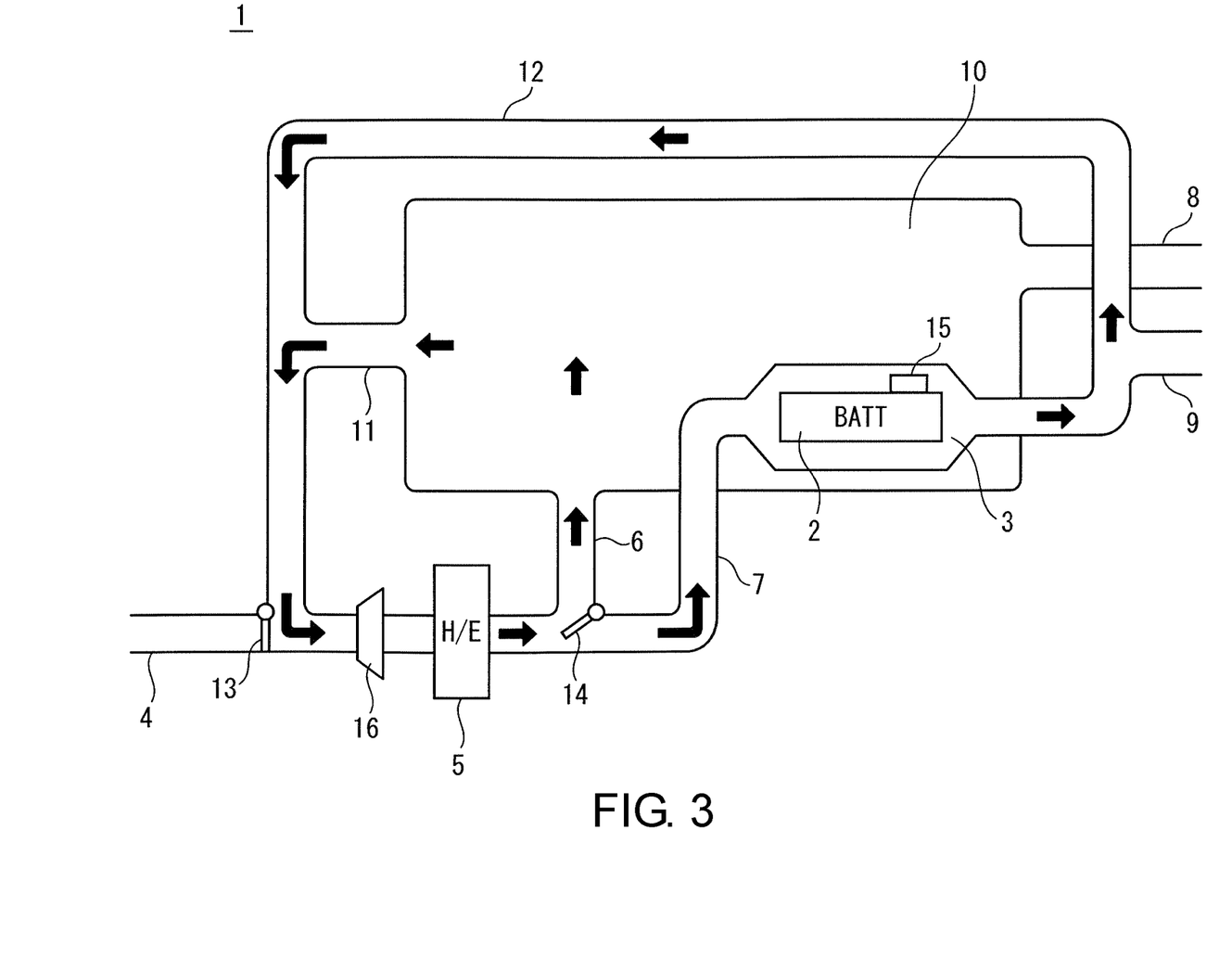
FIG. 3 is a view showing the air flow in an inside air circulation mode.

FIG. 3 is a view showing the air flow in the inside air circulation mode. When the switching valve 13 is at the position of closing the outside air introduction passage 4 and opening the first circulation passage 11 and the second circulation passage 12, the introduction of the outside air is stopped, and the discharge of air to the outside of the vehicle is also stopped accordingly. In the inside air circulation mode, the air cooled by the heat exchanger 5 is distributed to the vehicle room 10 and the battery capsule 3 by the flow rate adjusting valve 14 as in the outside air introduction mode, and then the air in the vehicle room 10 is returned via the first circulation passage 11 and the air in the battery capsule 3 is returned via the second circulation passage 12. The returned air is cooled by the heat exchanger 5 and is supplied to the vehicle room 10 and the battery capsule 3 again.

Accordingly, even in the inside air circulation mode, since the air cooled by the heat exchanger 5 is supplied to the vehicle room 10 and the battery capsule 3 independently of each other via the first air conditioning passage 6 and the second air conditioning passage 7, respectively, the cooling of the vehicle room 10 and the cooling of the battery 2 can be efficiently performed independently. Further, since the first circulation passage 11 for circulating the air in the vehicle room 10 and the second circulation passage 12 for circulating the air in the battery capsule 3 are separately provided, it is possible to prevent the high-temperature exhaust air after heat exchange with the battery from directly flowing into the vehicle room, it is possible to prevent the air conditioning performance in the vehicle room 10 from deteriorating, and it is also possible to prevent causing discomfort to the occupant due to warm air or the like.

Figure 4:
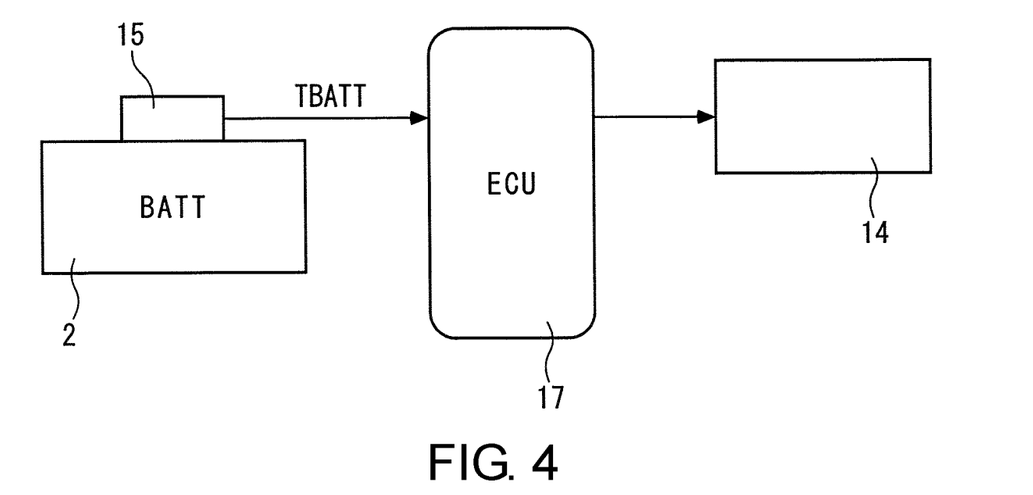
FIG. 4 is a block diagram showing a flow rate adjusting means in the vehicle battery cooling device of FIG. 1.

Next, flow rate adjustment control using the flow rate adjusting valve 14 will be described with reference to FIG. 4 to FIG. 6. As shown in FIG. 4, in this embodiment, a battery temperature sensor 15 which detects a temperature (battery temperature) TBATT of the battery 2 is provided, and the detection signal is sequentially outputted to an ECU 17 (electronic control unit).

The ECU 17 is configured by a microcomputer including a CPU, a RAM, a ROM, an I/O interface, etc. (none of which is shown). By changing an opening degree (hereinafter referred to as an adjusting valve opening degree) VOF of the flow rate adjusting valve 14 according to the detection signal detected by the battery temperature sensor 15, the ECU 17 changes the flow rate ratio of the first air conditioning passage 6 and the second air conditioning passage 7. The adjusting valve opening degree VOF represents the opening degree of the flow rate adjusting valve 14 on the battery side (second air conditioning passage side). For example, VOF=0% means that the opening degree on the battery side (second air conditioning passage side) is 0% (fully closed), and the opening degree on the vehicle room side (first air conditioning passage side) is 100% (fully open); VOF=100% means that the opening degree on the battery side is 100% (fully open), and the opening degree on the vehicle room side is 0% (fully closed).

FIG. 5 is a flowchart showing a control process of the flow rate adjustment by the flow rate adjusting valve 14. This process is repeatedly executed, for example, at a predetermined cycle while the vehicle battery cooling device 1 is in operation. First, in step 1 (shown as "Si"; the same applies hereinafter), it is determined whether a detected battery temperature TBATT exceeds a predetermined first threshold temperature TTHR1. The first threshold temperature TTHR1 is set, for example, to such a temperature that the battery needs to be cooled rapidly if the battery temperature TBATT exceeds this temperature. Therefore, if the answer in step 1 is YES, it is determined that the battery 2 is in a high-temperature state requiring rapid cooling, the battery side is controlled to be in a fully open state by setting the adjusting valve opening degree VOF to 100% (step 2), and this process is ended. If the answer in step 1 is NO, the process proceeds to the next step, i.e., step 3.

In step 3, it is determined whether the battery temperature TBATT is lower than a predetermined second threshold temperature TTHR2. The second threshold temperature TTHR2 is a temperature lower than the first threshold temperature TTHR1 and is set to such a temperature that when the battery temperature TBATT is lower than this temperature, the battery 2 is sufficiently cooled and does not require cooling. Therefore, if the answer in step 3 is YES, it is determined that the battery 2 is in a low-temperature state and does not require cooling, the battery side is controlled to be in a fully closed state by setting the adjusting valve opening degree VOF to 0% (step 4), and this process is ended.

If the answer in step 3 is NO, i.e., if the battery temperature TBATT is equal to or lower than the first threshold temperature TTHR1 and equal to or higher than the second threshold temperature TTHR2, by searching in the map shown in FIG. 6, the adjusting valve opening degree VOF is set according to the battery temperature TBATT (step 5), and this process is ended.

In this map, the adjusting valve opening degree VOF is set to increase linearly from 0% to 100% in a range of the battery temperature TBATT from equal to or higher than the second threshold temperature TTHR2 to equal to or lower than the first threshold temperature TTHR1. The setting of the adjusting valve opening degree VOF is not limited thereto, and for example, the adjusting valve opening degree VOF may be controlled to change non-linearly according to the battery temperature TBATT.

Figure 7:
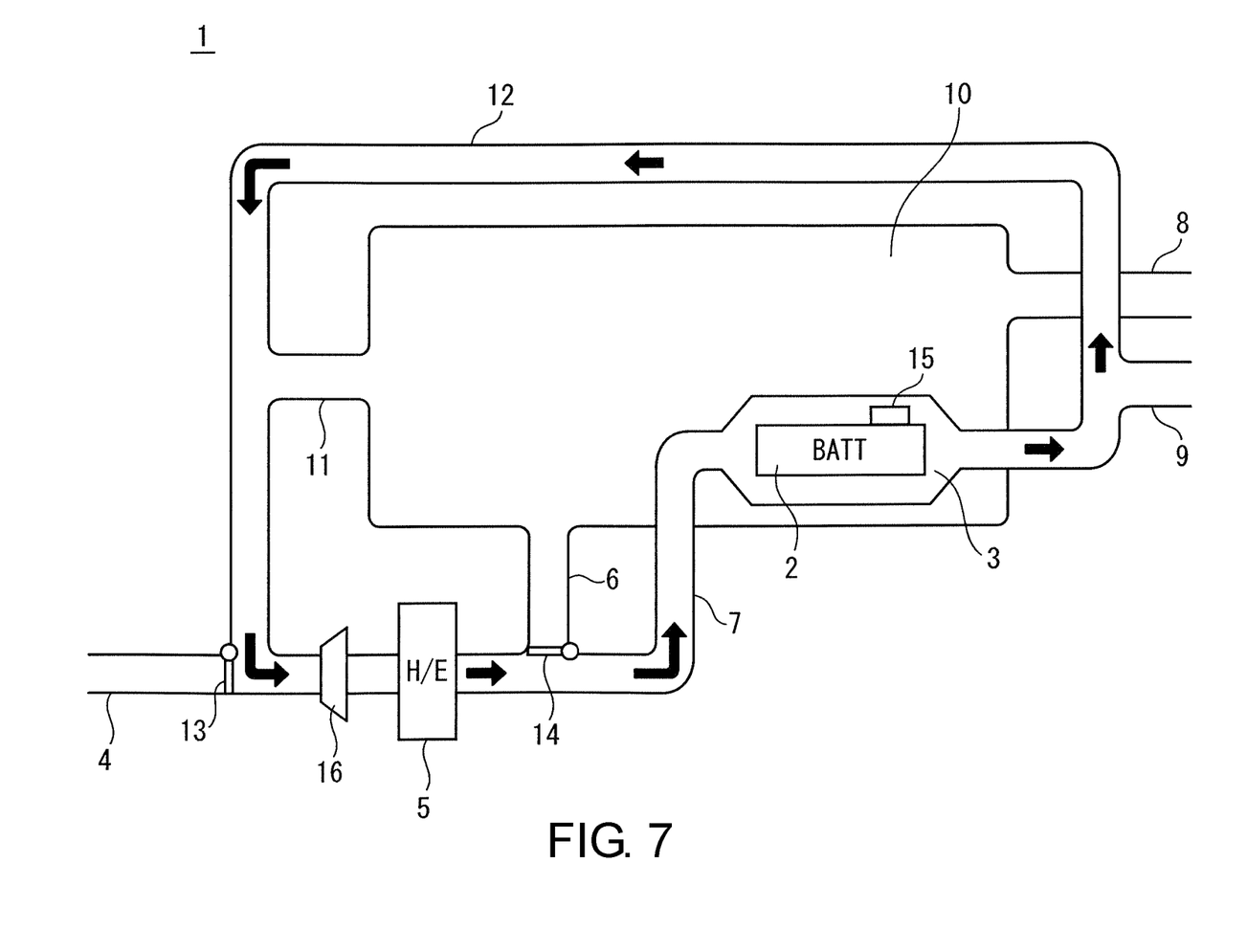
FIG. 7 is a view showing the air flow when the opening degree on the battery side of the flow rate adjusting valve is in a fully open state.

FIG. 7 shows the air flow when the adjusting valve opening degree VOF is controlled to 100% in the inside air circulation mode. In that case, since the entire amount of the air cooled by the heat exchanger 5 is sent to the battery capsule 3, the battery 2 can be efficiently cooled in a shorter time.

Figure 8:
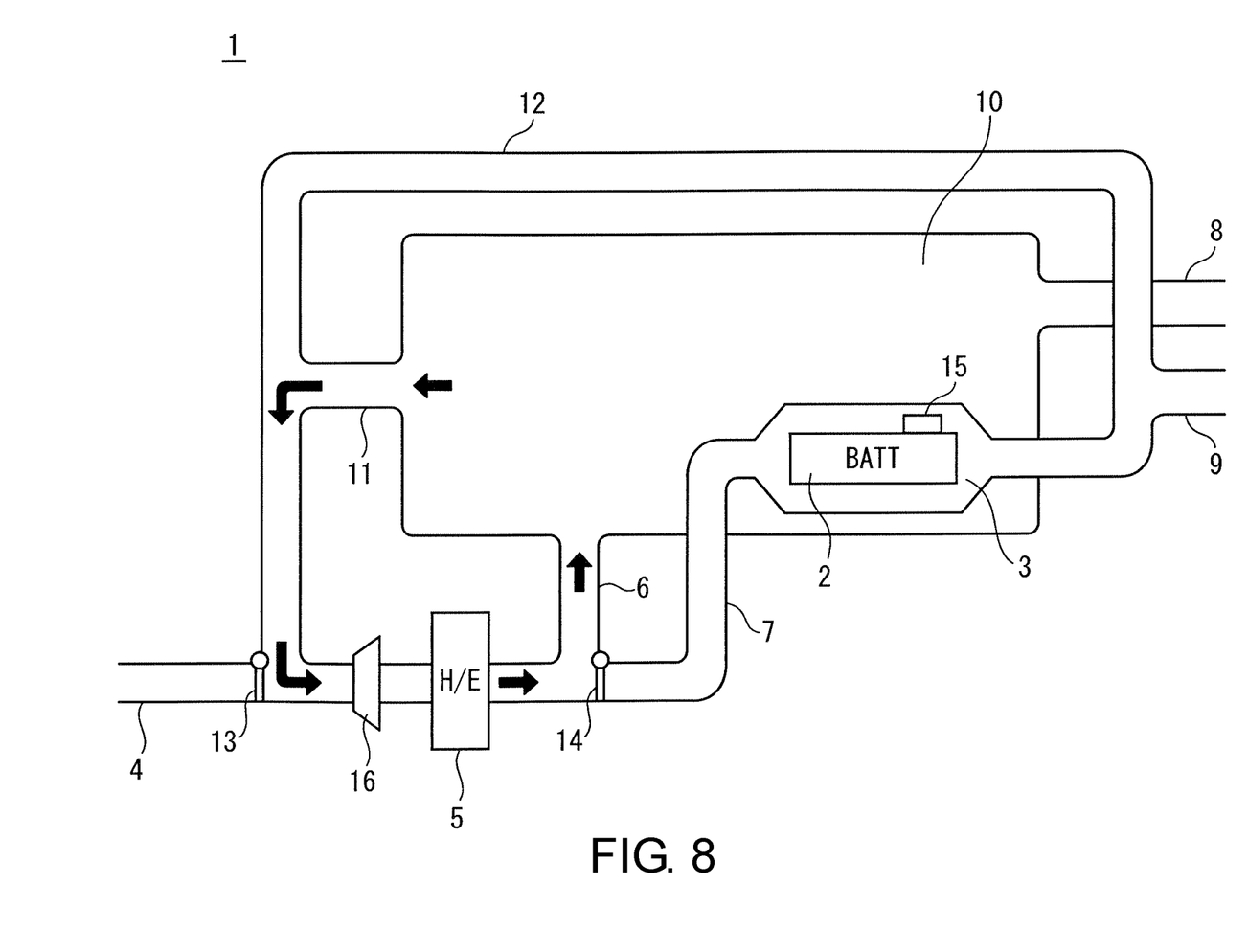
FIG. 8 is a view showing the air flow when the opening degree on the battery side of the flow rate adjusting valve is in a fully closed state.

FIG. 8 shows the air flow when the adjusting valve opening degree VOF is controlled to 0% in the inside air circulation mode. In that case, since the entire amount of the air cooled by the heat exchanger 5 is sent to the vehicle room 10, the vehicle room 10 can be efficiently cooled.

The disclosure is not limited to the described embodiments and may be carried out in various other forms. For example, in the above embodiments, the battery capsule is arranged inside the vehicle room, but it is also possible to arrange the battery capsule outside the vehicle room. In addition, it is possible that the battery capsule does not have heat insulating properties, and in that case, by arranging the battery capsule in the vehicle room, the exhaust heat of the battery may add to the air conditioning performance in cold weather use such as performing heating as air conditioning in the vehicle room, which can contribute to the improvement of the heating performance. In addition, it is possible to appropriately change the detailed configuration within the scope of the gist of the disclosure.

What is claimed is:

1. A vehicle battery cooling device, in a vehicle equipped with a battery for driving, comprising:
    a battery accommodation part accommodating the battery;
    an outside air introduction passage introducing air outside the vehicle as outside air;
    a heat exchanger cooling air introduced into the outside air introduction passage;
    a first air conditioning passage communicated to the heat exchanger and a vehicle room to supply air cooled by the heat exchanger to the vehicle room;
    a second air conditioning passage communicated to the heat exchanger and the battery accommodation part to supply air cooled by the heat exchanger to the battery accommodation part;
    a first discharge passage discharging air in the vehicle room to outside the vehicle;
    a second discharge passage discharging air in the battery accommodation part to outside the vehicle;
    a first circulation passage communicated to the vehicle room and the outside air introduction passage to circulate air in the vehicle room as inside air to the outside air introduction passage; and
    a second circulation passage communicated to the battery accommodation part and the outside air introduction passage to circulate air in the battery accommodation part as inside air to the outside air introduction passage.

2. The vehicle battery cooling device according to claim 1, further comprising:
    a mode switching valve provided at a connection part of the outside air introduction passage connected with the first circulation passage and the second circulation passage, and switching between an outside air introduction mode which introduces outside air into the heat exchanger and an inside air circulation mode which circulates inside air to the heat exchanger by opening and closing the outside air introduction passage; and
    a flow rate adjusting means provided on a downstream side of the heat exchanger and adjusting amounts of air flowing respectively to the first air conditioning passage and the second air conditioning passage.

3. The vehicle battery cooling device according to claim 2, further comprising:
    a battery temperature sensor detecting a temperature of the battery,
    wherein the flow rate adjusting means variably adjusts the amounts of air flowing respectively to the first air conditioning passage and the second air conditioning passage according to the temperature of the battery detected by the battery temperature sensor.

4. The vehicle battery cooling device according to claim 1, wherein the battery accommodation part is arranged in the vehicle room.

5. The vehicle battery cooling device according to claim 2, wherein the battery accommodation part is arranged in the vehicle room.

6. The vehicle battery cooling device according to claim 3, wherein the battery accommodation part is arranged in the vehicle room.

* * * * *